United States Patent [19]

Torok

[11] 4,267,498
[45] May 12, 1981

[54] DRIVE EQUIPMENT WITH TWO-PHASE SYNCHRONOUS MOTOR

[75] Inventor: Vilmos Torok, Lidingo, Sweden

[73] Assignee: ASEA Aktiebolag, Vesteras, Sweden

[21] Appl. No.: 108,075

[22] Filed: Dec. 28, 1979

[30] Foreign Application Priority Data

Dec. 12, 1978 [SE] Sweden ................. 7813347

[51] Int. Cl.³ .................. H02P 5/34; H02P 7/42; H02M 5/458
[52] U.S. Cl. .................. 318/723; 318/800; 363/10
[58] Field of Search ......... 318/715, 720, 721, 722, 318/723, 724, 798, 799, 800, 801, 802, 803, 807, 809; 363/9, 10, 34, 36, 37, 160, 161, 162

[56] References Cited

U.S. PATENT DOCUMENTS

| 3,588,668 | 6/1971 | Cova ................. 363/162 |
| 4,013,937 | 3/1977 | Pelly et al. ........... 363/161 X |
| 4,125,796 | 11/1978 | Nagase et al. ......... 318/721 |

FOREIGN PATENT DOCUMENTS 1638370  6/1970  Fed. Rep. of Germany ............ 363/37

OTHER PUBLICATIONS

"What's Available in Adjustable", A. Kusko—Control Engineering Mag. pp. 58–64, Aug. 1968.
"Modern Electrical Drive Systems", V. Naidu—Iron and Steel Engineer Mag. pp. 70–81, Oct. 1970.

*Primary Examiner*—Stanley J. Witkowski
*Assistant Examiner*—Richard M. Moose
*Attorney, Agent, or Firm*—Pollock, Vande Sande & Priddy

[57] ABSTRACT

A motor drive apparatus includes a two-phase synchronous motor having two power windings. The motor is supplied with power from an alternating voltage network through a direct convertor. The converter has two controllable converter bridges that are supplied with power by the network. Each power winding of the motor is connected between a DC terminal of one bridge and a DC terminal of the other bridge. The power windings have center taps that are connected.

9 Claims, 5 Drawing Figures

DRIVE EQUIPMENT WITH TWO-PHASE SYNCHRONOUS MOTOR

TECHNICAL FIELD

The present invention relates to a drive system that has a two-phase synchronous motor with two power windings and that is supplied via a frequency convertor.

BACKGROUND OF THE INVENTION

In this application "frequency convertor" means a static convertor for transforming AC of one frequency to AC of another frequency. "Intermediate link convertor" means a frequency convertor having a rectifier and an inverter, which are joined by a DC link. "Direct convertor" means a frequency convertor without a DC intermediate link (often also called a "cycloconvertor").

It is known in the art that synchronous motors may be supplied by means of intermediate link convertors having a recifier and a machine-commutated inverter of variable frequency. At low speeds, the voltage of such machines is low. In order to obtain a safe commutation, special measures must be taken, for example, the current may be limited or reduced for each commutation. However, such current limiting techniques cause torque pulsations and result in a considerable reduction of the available torque, thereby reducing the efficiency of utilization of the machine. Moreover, in convertors of the above-mentioned type, at least four valves are operated to conduct simultaneously (two in the rectifier and two in the inverter), thereby causing a relatively high voltage drop and correspondingly high convertor losses.

Also, the invertor for an intermediate link convertor of a two-phase machine cannot be made as a standard convertor, for example a conventional three-phase bridge, but must be specially made, both with regard to its main circuits and its auxiliary circuits (e.g. protective, supervision, and control circuits). Thus, considerable economic and practical disadvantages are associated with such intermediate link convertors.

Accordingly, it is a primary object of the invention to provide a motor drive system of the above-described kind wherein, particularly at low speeds, the torque pulsations of the motor are considerably lower than for previously known apparatus.

It is another object of the invention to provide such drive equipment that efficiently utilizes a machine while maintaining low convertor losses.

A further object of the invention is to provide a drive system wherein simple standard convertors may be modified to a limited extent to supply a motor.

BRIEF SUMMARY OF THE INVENTION

In order to achieve the objects of the invention and to overcome the problems of the prior art, the drive apparatus, according to the invention, includes a two-phase synchronous motor that has two power windings. Each power winding is comprised of two half winding portions.

In the drive apparatus, a frequency converter is operated as a direct converter and includes two convertor bridges that are supplied with power from an AC voltage network. Each bridge includes a plurality of thyristors and each power winding of the motor is connected between a DC terminal of one bridge and a DC terminal of the other bridge. The power windings have center taps that are connected to one another by an inductor that operates to stabilize the current of the motor.

A control system is provided to control the conducting states of the thyristors of the bridges in accordance with a line supply voltage and the position of a rotor of the motor. In operation, the commutation between thyristors that are connected to different main phases is accomplished by means of a particular line control angle $\alpha$ that is applied to control the working current of the motor.

The conducting states of the thyristors are defined so that commutation of the working current from one-half of a particular power winding to the other half of the winding takes place in accordance with a particular machine control angle that is reduced with increasing motor speed. The machine control angle is also reduced when the working current of the motor increases.

At motor speeds below a predetermined value, when the working current from a half winding portion of a particular winding commutates to an associated opposite half winding portion of the winding, the commutating voltage of the AC voltage network cooperates with the commutating voltage that is induced in the particular winding.

DETAILED DESCRIPTION OF PREFERRED EMBODIMENTS

Figure 1:
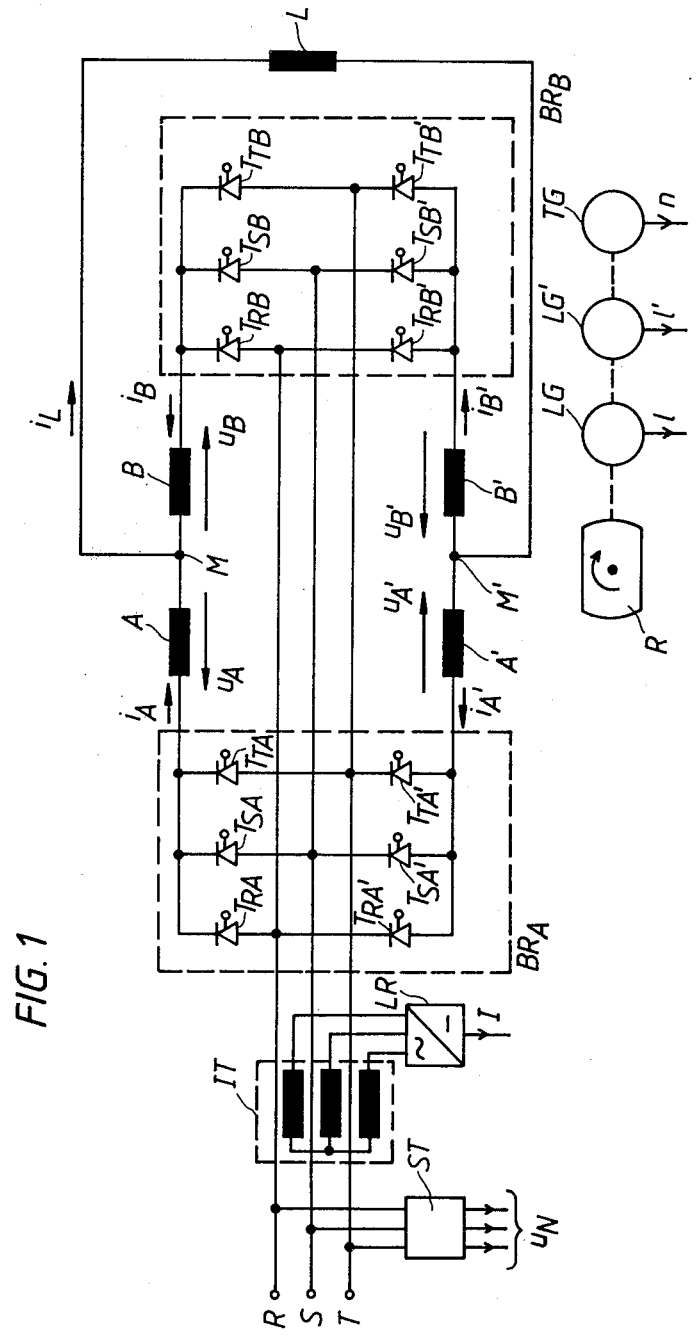
FIG. 1 shows a circuit diagram of the main circuits for an apparatus constructed in accordance with the invention.

FIG. 1 shows a two-phase synchronous motor of a reluctance type. The motor has two power windings A-B and A'-B' which are mutually displaced by 90°. Each winding has a center tap M and M', respectively, and the taps are interconnected through a smoothing inductor L that acts to smooth the current that passes through the power windings of the motor. The motor has a rotor R to which are connected position indicators LG and LG' that provide output signals 1 and 1' that indicate the position of the rotor. A tachometer generator TG is provided to generate an output signal that registers the speed of rotation n of the motor, in a manner known to the art. The motor has magnetizing windings (not shown), that operate to make the motor work as a synchronous motor. That is, the motor is able to generate reactive power and has voltages that are induced in the power windings independently of supply.

The motor is supplied from a three-phase AC voltage network R, S, T through two controllable line-commutated convertor bridges $BR_A$ and $BR_B$. The winding A-B has one of its end points connected to a DC terminal of the bridge $BR_A$ and its other end point connected to the corresponding terminal of the bridge $BR_B$. In a similar fashion, the winding A'-B' is connected between the other two DC terminals of the bridges.

The bridge $BR_A$ is comprised of thyristors $T_{RA} \ldots T_{TA}$, and the bridge $BR_B$ is comprised of thyristors $T_{RB} \ldots T_{TB}$.

A voltage transormer ST and a current transformer IT are arranged in the AC leads of the bridges. The voltage transformer ST delivers output signals $u_N$, which provide control pulse devices of the bridges with necessary information about the phase position of the line AC voltage. The current transformer IT emits an analogous signal I through a rectifier LR. The signal I is a measure of the working current of the motor.

The convertor bridges $BR_A$ and $BR_B$ may be conventional line-commutated thyristor bridges of a standard type. Also, a standard double convertor may be used, wherein the DC connections between the bridges are broken up and the motor windings are connected between the bridges.

In operation, the two upper halves of the bridges $BR_A$ and $BR_B$ are alternately conducting. During the half-cycle of the machine voltage when the voltage $u_A$ is positive, the upper half of the bridge $BR_A$ conducts and supplies a current $i_A$ through the left-hand half A of the winding A-B. During the next half-cycle of the machine voltage, the voltage $u_B$ is positive, and the upper half of the bridge $BR_B$ supplies a current $i_B$ through the right-hand half B of the winding A-B. The commutation between the thyristors that are connected to different phases of the AC voltage network in the upper halves of the bridges takes place with the aid of the line AC voltage and is controlled by a conventional control pulse device that delivers control pulses with a length of 120° to the thyristors. It should be understood that the commutation of the current between the two winding halves A and B, and thus between the upper halves of the two bridges, is controlled in accordance with the position of the rotor R. At low speeds the commutation is performed by means of the line AC voltage and at high speeds the voltages induced in the machine windings control the commutation. In a midrange of speed, the commutation is controlled so that the line and machine voltages cooperate to provide a fast commutation between the two winding halves.

The winding A'-B' is offset in phase by 90° with respect to the winding A-B, but operates and is controlled in a corresponding manner. The two lower halves of the bridges have a conventional control pulse device that controls the line commutations. That is, the commutations occur between thyristors that are connected to separate line phases, in the same way as was provided for the upper halves of the bridges.

Figure 2:
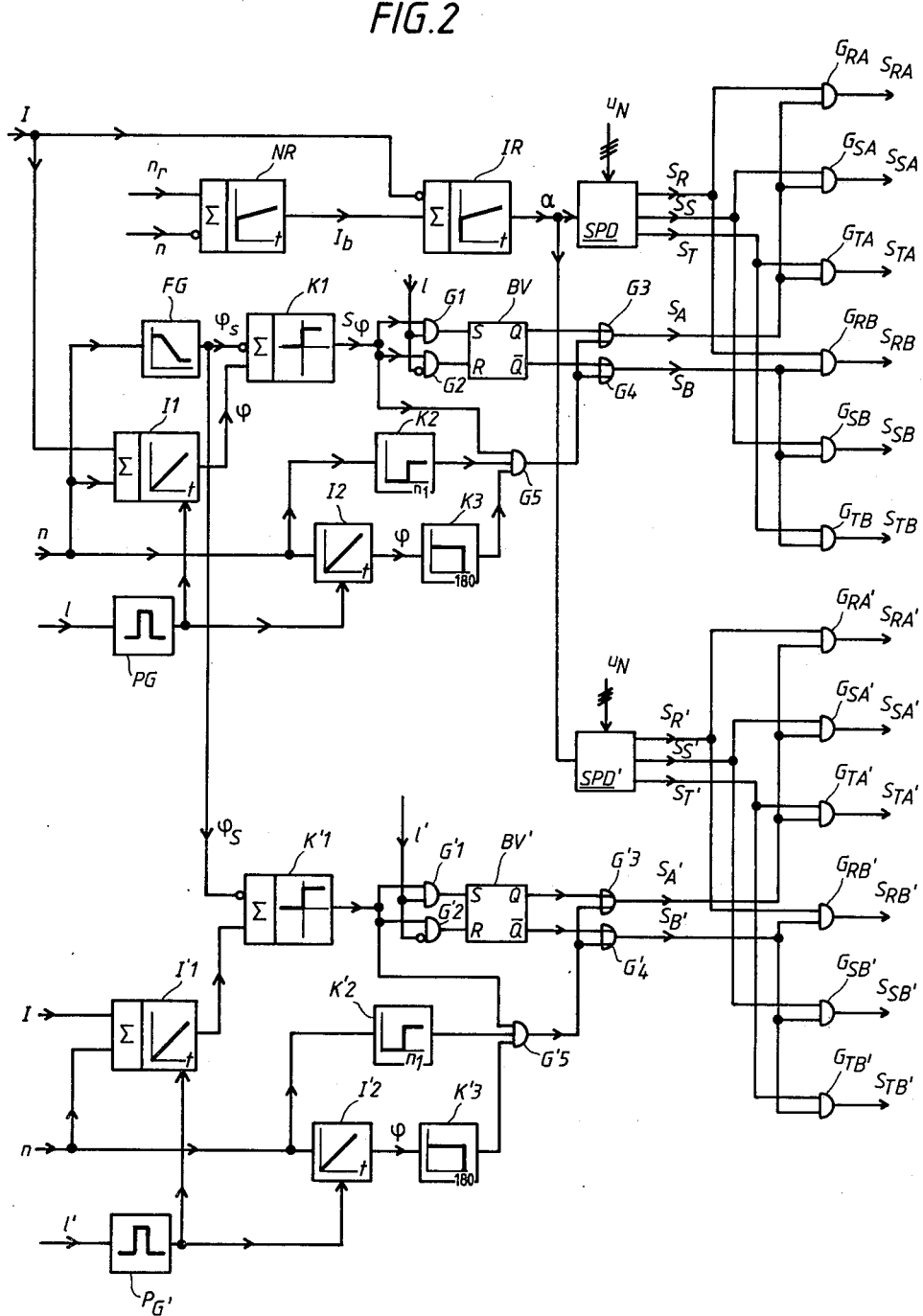
FIG. 2 shows a block diagram of an embodiment of the control circuits for the apparatus of FIG. 1.

FIG. 2 shows a design for a preferred embodiment of the control circuits of FIG. 1. A speed regulator NR is supplied with a speed reference value $n_r$, for example from a potentionmeter, as well as with a signal n from the tachometer generator TG, the signal n corresponding to the present speed of the motor. The output signal $I_b$ of the regulator is the desired value of the motor current and is supplied to a current regulator IR. A signal I corresponding to the present motor current, is obtained from the rectifier LR of FIG. 1 and is supplied to the current regulator IR. The output signal $\alpha$ of the current regulator IR is then applied to two control pulse devices SPD and SPD'. The pulse devices control the line commutations of the thyristors of the bridges so that the thyristors operate with a control angle (referred to as "line control angle") relative to the line voltage, that corresponds to the output signal $\alpha$ of the current regulator IR. The control pulse device SPD delivers control pulses to the thyristors ($T_{RA}$, $T_{BA}$, $T_{TA}$, $T_{RB}$, $T_{SB}$, $T_{TB}$) in the upper halves of the two bridges, and the control pulse device SPD' delivers control pulses to the thyristors ($T_{RA'}$, $T_{SA'}$, $T_{TA'}$, $T_{RB'}$, $T_{SB'}$, $T_{TB'}$) in the lower halves. Each control pulse that is applied to a thyristor preferably has a length of 120°, referred to the line voltage.

The control system of the invention will automatically influence the line control angle $\alpha$ of the bridges (and thus their DC voltage) and the motor current I (and thus the drive torque of the motor), so that the motor speed is maintained at a set desired value $n_r$.

The control pulses $S_R$, $S_S$ and $S_T$ from the control pulse device SPD are applied to the six thyristors in the upper halves of the bridges via the AND gates $G_{RA}$, $G_{SA} \ldots G_{TB}$. In addition, control signals $S_A$ and $S_B$ are applied to the gates, as shown in FIG. 2. If the signal $S_A$ is "1", the control pulses from SPD are passed to the thyristors ($T_{RA}$, $T_{SA}$, $T_{TA}$) that are connected to the winding portion A. If the signal $S_B$ is "1", the control pulses from SPD are passed to the thyristors ($T_{RB}$, $T_{SB}$, $T_{TB}$) that are connected to the winding portion B.

In a corresponding manner, the control pulse device SPD' emits control pulses $S_{R'}$, $S_{S'}$, and $S_{T'}$ to the thyristors in the lower halves of the bridges via six AND gates $G_{RA'} \ldots G_{TB'}$, which are controlled by control signals $S_{A'}$ and $S_{B'}$. The output signals $S_{RA'} \ldots S_{TB'}$, from the twelve AND gates $G_{RA} \ldots G_{TB'}$ are applied to the thyristors $T_{RA'} \ldots T_{TB'}$, preferably via power amplifiers (not shown).

The control signals $S_A$ and $S_B$ are generated as follows. The speed signal n from the tachometer generated TG is applied to a function generator FG that delivers an output control signal that corresponds to a machine control angle $\phi_s$, that is, the control signal, related to the machine voltage, at which commutation is the working current from one half of a winding to the other half is started. The function generator, for example, may be designed so that, at a machine frequency below 11 Hz, $\phi_s = 180°$, between the frequency 11 Hz and the frequency 36 Hz, $\phi_s$ decreases linearly and at frequencies above 36 Hz, $\phi_s = 100°$.

The machine frequency is the frequency of the AC voltages that are induced in the power windings of the machine. The machine frequency is proportional to the number of poles of the machine and the speed of rotation of the machine. Therefore, the machine frequency may be used as a measure of the speed of the machine, and vice versa.

The speed signal n is also supplied to an integrator I1. The integrator I1 is set to zero at each zero passage of the machine voltage ($u_A$ and $u_B$). The output signal of the integrator is a measure of the angle of rotation $\phi$ of the machine, expressed in electrical degrees and referenced from the last zero passage of the machine voltage.

The signals $\phi$ and $\phi_s$ are compared in a comparison means K1, which transmits a signal $S_{100}$ that is "0" when $\phi < \phi_s$ and "1" when $\phi > \phi_s$. The signal $S_{100}$ is applied to the S- and R-inputs of a bistable circuit BV through AND gates G1 and G2 that are controlled by the signal 1 from the position indicator LG. It should be understood that the output signal 1 of the position indicator is "0" during the half-cycle when the machine voltage $u_A$ is positive and "1" during the half-cycle when $u_B$ is positive.

Thus, during the half-cycle when $u_A$ is positive, the circuit BV is first at its "1"-state, that is, $Q = 1$ and $\bar{Q} = 0$. Also, $S_A$ is "1" and $S_B$ is "0" and, therefore, control pulses from SPD are passed to the thyristors $T_{RA}$, $T_{SA}$ and $T_{TA}$, but are not passed to the thyristors $T_{RB}$, $T_{SB}$, $T_{TB}$. Accordingly, winding half A is caused to carry current.

At $\phi = \phi_s$, $S_\phi$ becomes "1", thereby causing the gate G2 to emit a "1" signal to the R-input of the circuit BV and the circuit BV to then switch to its "0" state. The signals Q and $S_A$ then become "0" and the signals $\overline{Q}$ and $S_B$ become "1". Accordingly, the control pulses from SPD are passed to the thyristors $T_{RB}$, $T_{SB}$ and $T_{TB}$ but are not passed to the thyristors $T_{RA}$, $T_{SA}$ and $T_{TA}$. After commutation is completed, the winding portion B carries current and the winding portion A does not carry current.

At higher speeds the commutation of current between the two halves of a winding takes place solely with the help of the voltage that is induced in the windings. During the commutation, that is from $\phi = \phi_s$, when commutation is started and up to $\phi = 180°$, control pulses are delivered both to the thyristors that carried current before the commutation and to the thyristors that are to carry current after the commutation. In order to pass the control pulses, an AND gate G5 is operated to pass its output signal to two OR gates G3 and G4. When the output signal from the gate G5 is "1", both the signals $S_A$ and $S_B$ are "1", and control pulses are supplied to the thyristors connected to the winding half A as well as to the thyristors connected to the winding half B. The AND gate G5 receives the signal $S_\phi$ from the comparator K1 and a signal from a comparator K2 that is "1" if the machine frequency exceeds 36 Hz. An integrator I2 is operated to integrate the speed n. The integrator is set to zero at each zero passage of the machine voltage, and the output signal of the integrator is, therefore, a measure of the angle $\phi$. The output signal of the integrator I2 is applied to a comparator K3, the output signal of which is "1" if $\phi \geq 180°$ and "0" if $\phi < 180°$. The output signal of the comparator K3 is then applied to a third input of the gate G5. The gate G5 is then operated so that the signals $S_A$ and $S_B$ are both "1" during the interval $\phi_s < \phi < 180°$, provided that the machine frequency is greater than 36 Hz.

The output signal 1 from the position indicator LG is applied to a pulse forming device PG, for example a one-shot, that emits a short pulse at each leading edge of the output signal of the position indicator. The pulses of PG are applied to the integrators I1 and I2 to set the integrators to zero at $\phi = 0$.

The integrator I1 is supplied with a quantity corresponding to the machine current I, so that the control angle $\phi_s$ for the machine commutations is reduced with increasing current. The control angle $\phi_s$ which is obtained from the function transducer FG is, thus, the control angle with which the machine works at a low current. Each commutation takes a longer time as current is increased, and in the manner now described the commutations are started as late as possible in a manner independent of the current (resulting in the highest possble motor torque), while taking into consideration the fact that each commutation should be terminated before $\phi = 180°$.

The line-commutations of the six thyristors $T_{RA'} \ldots T_{TB'}$ that are connected to the winding A'-B' are controlled from a control pulse device SPD', which is identical with the control pulse device SPD, in accordance with the control angle signal $\alpha$ from the current regulator IR. The machine commutations are controlled by signals $S_{A'}$ and $S_{B'}$ that operate six AND gates $G_{RA'} \ldots G_{TB'}$ in the same manner as has been described above. The circuits that generate the signals $S_{A'}$ and $S_{B'}$ are operated in the same way as the circuits that generate the signals $S_A$ and $S_B$ and are controlled by the signal I from the current measurement device IT-LR, n from the tachometer generator TG, $\phi_s$ from the function generator FG and 1' from the position indicator LG'.

Figure 3:
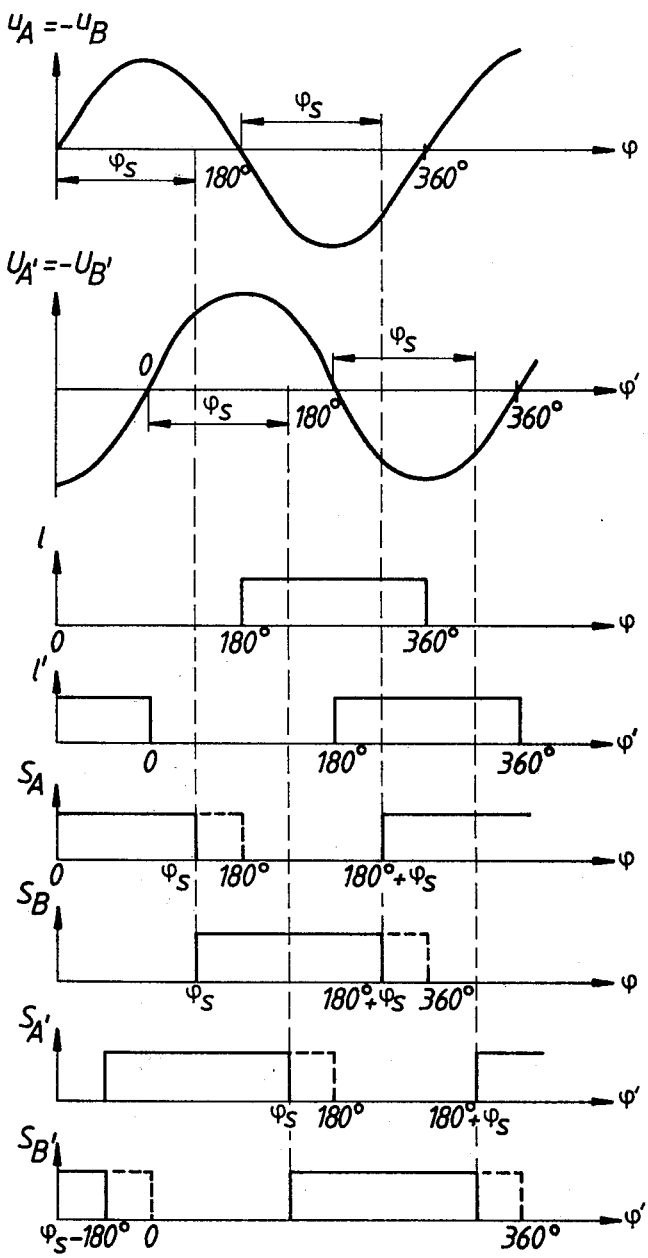
FIG. 3 shows a plot of the voltages induced in the windings of a motor and some of the signals of the control circuits, as a function of the position $\phi$ of the rotor of the motor.

At the top of FIG. 3 is shown the machine voltages $u_A = -u_B$, as a function of the rotor position $\phi$, expressed in electrical degrees. The machine control angle $\phi_s$ is shown, and in the figure $\phi_s = 135°$ has been chosen as an illustrative example. At $\phi = \phi_s$ the commutation of the current from the winding portion A to the winding portion B is started during the first half-cycle, and at the corresponding time during the next half-cycle the commutation from B to A is started. Moreover, FIG. 3 shows the output signal 1 from the position indicator LG and the control signals $S_A$ and $S_B$. The signal $S_A$ is "1" during the first half-cycle until $\phi = \phi_s$, when $S_A$ becomes "0" and $S_B$ becomes "1". At the next commutation (at $\phi = \frac{1}{2}° + \phi_s$) $S_A$ becomes "1" and $S_B$ becomes "0". The above applies to low and medium-low motor speed (the machine frequency being lower than 36 Hz) and is shown in unbroken lines in the figure. At a higher speed (the machine frequency exceeding 36 Hz) the signals are extended in the manner described above in connection with FIG. 2, such that $S_A$ is "1" until $\phi = 180°$ and $S_B$ is "1" until $\phi = 360°$ (broken lines).

FIG. 3 also shows the machine voltage $u_{A'} = -u_{B'}$ as a function of the angle of rotation $\phi'$, that is sensed by the position indicator LG'. The voltage $u_{A'}$ is offset in phase by 90° with respect to $u_A$ and the zero passage of $\phi'$ is, therefore, displaced 90° to the right in the Figure. FIG. 3 also shows the signal 1' from the position indicator LG', as well as the control signals $S_{A'}$ and $S_{B'}$, which, apart from phase displacement, are identical with the signals 1, $S_A$ and $S_B$.

Figure 4:
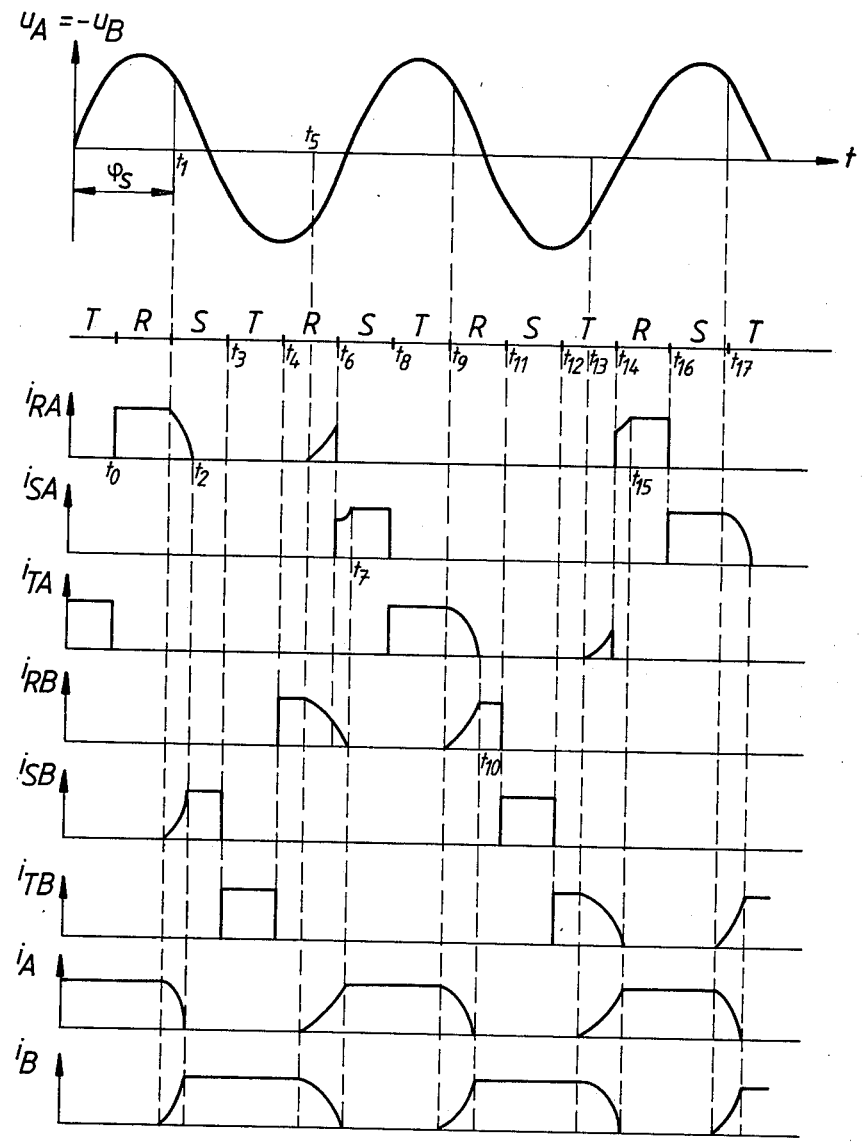
FIG. 4 illustrates a plot of control signals for the commutating process at a relatively low speed.

FIG. 4 shows the function of the apparatus of the invention at a speed corresponding to the machine frequency 30 Hz, where the frequency of the line voltage is assumed to be 50 Hz. The top of FIG. 4 shows the machine voltage $u_A$ as a function of time t. The machine control angle is $\phi_s \approx 135°$. Below the machine voltage curve is shown the conducting intervals of the thyristors that are connected to the different phases in the network, in the upper halves of the bridges $BR_A$ and $BR_B$. For example, during the interval marked R, the thyristors $T_{RA}$ and $T_{RB}$ may be conducting and a corresponding conducting operation may also occur for the other thyristors. Also shown are the currents $i_{RA} \ldots i_{TB}$ that pass through the six thyristors $T_{RA} \ldots T_{TB}$ that are connected to the winding A-B. At the bottom of FIG. 4 the currents $i_A$ and $i_B$ that pass through the two halves of the winding are shown.

At $t = 0$ the winding half A is current-carrying, and the thyristor $T_{TA}$ is conducting. At $t = t_0$ a line commutation takes place and the thyristor $T_{RA}$ takes over the circuit. At $t = t_1$, $\phi = \phi_s$ and the control signal $S_A$ in FIG. 3 becomes "0" and $S_B$ becomes "1", that is, a machine commutation is started and, at the same time, a line commutation is started. Also, the thyristor $T_{SB}$ is ignited and the line voltage, which now cooperates with the machine voltage $u_A$-$u_B$, commutates the current from the thyristor $T_{RA}$ over to the thyristor $T_{SB}$ and from the winding portion A to the winding portion B. The commutation is terminated at $t = t_2$ and, thereafter, the current $i_A$ is zero and $i_B$ is equal to the machine current I.

At t=t₃ the next line commutation occurs (from $T_{SB}$ to $T_{TB}$) and at t=t₄ an additional line commutation occurs (from $T_{TB}$ to $T_{RB}$).

At t=t₅, $\phi=\phi_s$ again, and the next machine commutation is started. The starting of the commutation is achieved by igniting the thyristor $T_{RA}$ so that the machine voltage starts commutating the current over to the thyristor $T_{RA}$. Howevr, the commutation is not ended until t=t₆, at which time a line commutation is performed by firing the thyristor $T_{SA}$. The commutating voltage for the line commutation will, thus, cooperate with the machine voltage, which enables the commutation to be rapidly and safely completed at t=t₇.

At t=t₈, a line commutation is executed to $T_{TA}$. At t=t₉ a line commutation and a machine commutation start simultaneously. The line voltage and the machine voltage cooperate and commutate the current over from the thyristor $T_{TA}$ to the thyristor $T_{RB}$ and the commutation is ended at t=t₁₀. Thereafter, at t=t₁₁ and t=t₁₂, pure line commutations are executed.

At t=t₁₃ a machine commutation is started by firing the thyristor $T_{TA}$ so that the machine voltage starts commutating the current over to the thyristor $T_{TA}$. At t=t₁₄ a line commutation is started by firing the thyristor $T_{RA}$, the current $i_A$ is then commutated instantaneously over to the thyristor $T_{RA}$ and the line and machine voltages cooperate and complete the machine commutation at t=t₁₅. Thereafter, at t=t₁₆, a pure line commutation is executed and, at t=t₁₇, a line commutation and a machine commutation are started simultaneously.

In the drive apparatus of the invention, the line and machine commutations cooperate during a commutation so that the commutation may be made rapidly and may be initiated at a late stage of the half-cycle (i.e., a large machine control angle $\phi_s$). Therefore, a high motor torque is provided with low torque pulsations and a full motor current may be applied, even for a start operation.

At higher motor speeds, the line commutations may give rise to torque disturbances. Moreover, if a line commutation is initiated immediately after a machine commutation has been started, the commutation may be terminated too early, thereby causing a deterioration in the efficiency of utilization of the machine. According to a preferred embodiment of the invention, the described cooperation between line and machine commutation is inhibited at higher speeds, and the machine commutations are performed only with the help of the machine voltage. A suitable speed limit for inhibition is, for example, a speed which corresponds to the machine frequency 36 Hz. Above this limit (see the description of FIGS. 2 and 3) the signals $S_A$ and $S_B$ are both "1", between $\phi=\phi_s$ and $\phi=180°$. Thus, at speeds in excess of the limit, control pulses are supplied to the thyristors in the two upper halves of the convertor bridges $BR_A$ and $BR_B$ and the line commutations then take place internally within each bridge and do not influence the machine commutation.

Figure 5:
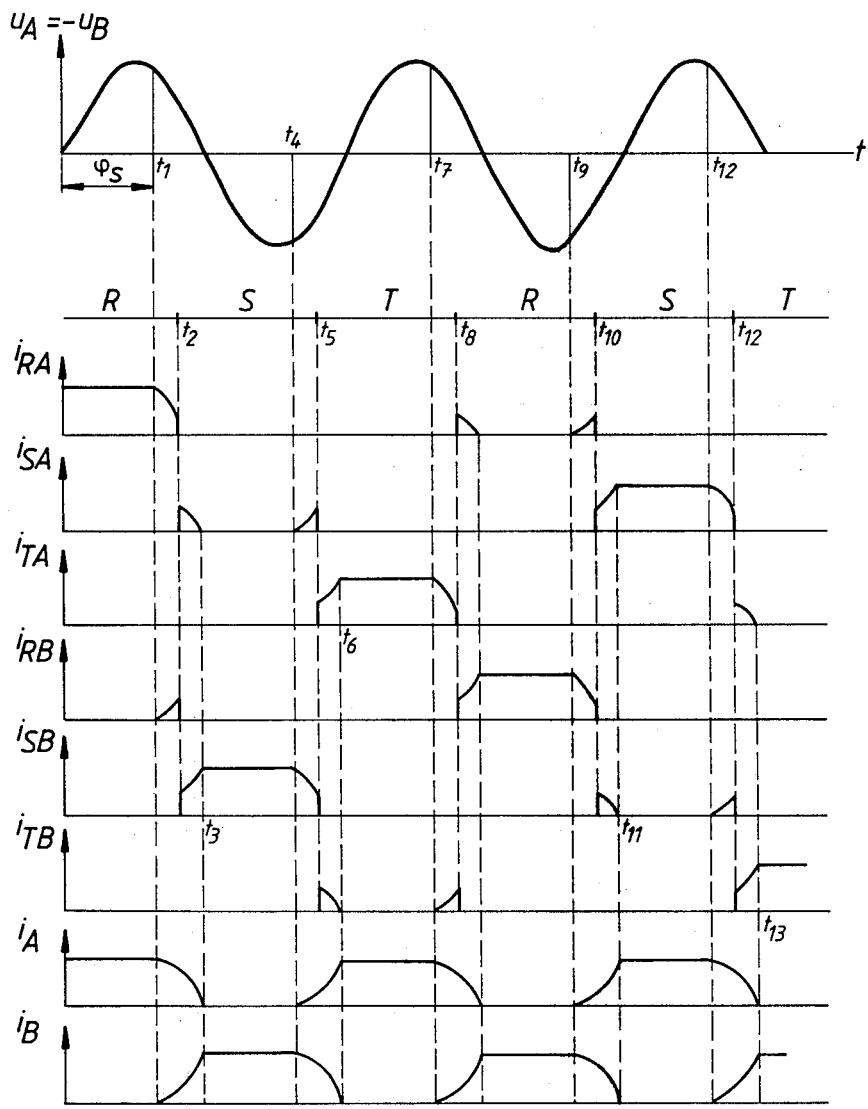
FIG. 5 shows a plot of the central signals of FIG. 4 for a relatively high speed.

FIG. 5 shows the function of the apparatus of the invention at a relatively high speed, for example a machine frequency of about 75 Hz. The top of FIG. 5 shows the machine voltage $u_A$ and a machine control angle $\phi_s \approx 100°$ is illustrated. Also illustrated are the conducting intervals of the different line phases as well as the currents $i_{RA} \ldots i_{TB}$ that pass through the thyristors in the upper halves of the bridges and the currents $i_A$ and $i_B$ that flow in the winding halves A and B.

Between t=0 and t=1, the thyristor $T_{RA}$ and the winding half A carry current. At t=t₁ a machine commutation is initiated by firing the thyristor $T_{RB}$ and at t=t₂ a line commutation occurs when $T_{SA}$ and $T_{SB}$ are fired. The firing of both of the thyristors, which are connected to phase S, causes an internal combustion to take place in each bridge (to $T_{SA}$ and $T_{SB}$, respectively) without affecting the machine commutation. Thereafter, at t=t₃ the machine commutation is ended. At t=t₄ the next machine commutation is started and is ended at t=t₆. The commutation of t₄ takes place without being affected by an intermediate line commutation at t=t₅. It should be understood that the operation is the same for the machine commutations at t=t₇, t=t₉ and t=t₁₂ that follow the above-described commutations.

The machine control angle $\phi_s$ is generated by a function generator FG as a function of the speed n of the machine, as is described with reference to FIG. 2. The machine commutation should take place as close to $\phi=180°$ as possible in order to maintain a high efficiency of machine utilization and a low level of torque pulsations. At low speeds, for example when the machine frequency is below 11 Hz, the system sets $\phi_s=180°$ in the above-described manner. However, at machine frequencies exceeding 11 Hz the commutations will end at too late a stage if $\phi_s$ is maintained at 180°. Therefore, $\phi_s$ is successively reduced with increasing speed, for example linearly, to $\phi_s=100°$ at the frequency 36 Hz. The value of $\phi_s$ is maintained at $\phi°$ for a sufficiently rapid machine commutation.

It should be understood from the above that a drive system according to the invention offers several considerable advantages in comparison to previously known drive systems. Thus, the apparatus of the invention provides improved operating conditions whereby a machine may be efficiently operated at low speeds with relatively low torque pulsations and with a full torque start-up capability. Moreover, the losses in the convertor are reduced in the apparatus of the invention by reducing (from four to two) the number of thyristors that are operated to conduct simultaneously. Also, the main circuits and the protection and supervision apparatus and a considerable portion of the control circuits of the convertor may be constructed in a simple manner from standard convertor units.

Although the above-described drive apparatus has a reluctance motor with magnetizing windings, it should be appreciated that other types of synchronous machines may be used without departing from the spirit of the invention. Also, although the apparatus of a preferred embodiment of the invention is supplied from a three-phase AC voltage network, it should be understood that the apparatus may be supplied by a single-phase network if the two convertor bridges are single-phase and if the control circuits are modified correspondingly. Moreover, for the preferred embodiment of the invention, the apparatus is operated in only one direction of rotation (i.e. a two quadrant operation). However, alternatively, the apparatus may be easily modified so that it can be operated in two directions of rotation (i.e. a four-quadrant operation).

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

The position indicators LG and LG' of FIG. 1 may, for instance, be conventional photo-electric indicators with a vane fixed to the rotor shaft, which vane periodically interrupts a light beam for an interval corresponding to 180° of the machine voltage. The vane is fixed in such a position that the output signal (1 or 1') from the indicator has the phase position indicated in FIG. 3 in relation to the machine voltage ($u_A$ or $u_{A'}$).

The control pulse units SPD and SPD' in FIG. 2 may be conventional control pulse generators, for instance of the kind described in the "Westinghouse Silicon Controlled Rectifier Designer's Handbook", 1st ed. 1963, pages 7.40–7.59.

The function generator FG may be of the kind commonly used in analogue computing technology, that is an operation amplifier whose feedback and/or input networks comprise an arrangement of resistors and biased diodes.

I claim:

1. In a drive apparatus of a type including a two-phase synchronous motor with two power windings and a frequency convertor for supplying power to said motor from an AC voltage network, an improved frequency convertor comprising:
    two convertor bridges connected for receiving power from said AC voltage network;
    first means for connecting each of said power windings between a DC terminal of one bridge and a DC terminal of the other bridge, each of said power windings having a center tap means; and
    second means for connecting the center tap means of one of said power windings to the center tap means of the other power winding, where said improved convertor is operated as a direct convertor.

2. The drive apparatus of claim 1 wherein said second means for connecting is a smoothing inductor for smoothing the flow of a motor current.

3. The drive apparatus of claim 1 wherein each of said convertor bridges includes a plurality of valves and said motor includes a rotor and means for rotating the rotor, and including means responsive to the AC voltage of said AC voltage network for registering the phase position of said AC voltage, and control means responsive to said phase position and the position of said rotor for operating said plurality of valves.

4. The drive apparatus of claim 3 wherein said control means include phase control means responsive to a line control angle signal ($\alpha$) for operating to commutate current betwen valves connected to different phases of said AC voltage network.

5. The drive apparatus of claim 4 wherein said control means includes control members for generating said line control angle signal and applying said control angle signal to control a working current for said motor.

6. The drive apparatus of claim 3 wherein each of said power windings includes a first half winding portion and a second half winding portion and said control means includes means for generating a machine control angle ($\phi_s$) signal for operating said valves to provide a commutation of a working current from a first half winding portion of a winding to a second half winding portion of the winding.

7. The drive apparatus of claim 6 including means for reducing said machine control angle signal as the speed of rotation of said rotor increases.

8. The drive apparatus of claim 6 including means for reducing said machine control angle signal as a working current of the motor increases.

9. The drive apparatus of claim 1 wherein each of said convertor bridges includes a plurality of valves and each of said power windings includes a first half winding portion and a second half winding portion, the drive apparatus further including control means for operating said valves so that at rotor speeds below a predetermined value a commutating voltage of said AC voltage network and a commutating voltage induced in a winding cooperate to commutate a working current from the first half winding portion of the winding to the second half winding portion of the winding.

* * * * *